United States Patent [19]

Hughes et al.

[11] 4,124,297
[45] Nov. 7, 1978

[54] ULTRAFAST SCANNING SPECTROPHOTOMETER

[75] Inventors: Richard S. Hughes, Ridgecrest; Julian L. Thompson, Lancaster, both of Calif.

[73] Assignee: The United States of America as represented by the Secretary of the Navy, Washington, D.C.

[21] Appl. No.: 818,787

[22] Filed: Jul. 25, 1977

[51] Int. Cl.$^2$ .................................................. G01J 3/06
[52] U.S. Cl. ...................................... 356/308; 356/320
[58] Field of Search ...................... 356/74, 83, 84, 100, 356/96–98, ; 358/213; 250/211 R

[56] References Cited

U.S. PATENT DOCUMENTS

| | | | |
|---|---|---|---|
| 3,826,865 | 7/1974 | Quate | 358/213 |
| 3,826,866 | 7/1974 | Quate et al. | 358/213 |
| 3,886,331 | 5/1975 | Schierer, Jr. | 356/83 X |
| 3,973,849 | 8/1976 | Jackson et al. | 356/83 X |

*Primary Examiner*—F. L. Evans
*Attorney, Agent, or Firm*—R. S. Sciascia; Roy Miller; W. Thom Skeer

[57] ABSTRACT

A scanning spectrophotometer employes fixed optics to produce a dispersion of optical energy. The dispersed optical energy is scanned by a fixed position surface acoustic wave photoelectric transducer. The scan rate of the surface acoustic wave photoelectric transducer is determined by associated electronic circuitry to produce scan rates permitting real-time spectral measurements from a moving platform.

10 Claims, 1 Drawing Figure

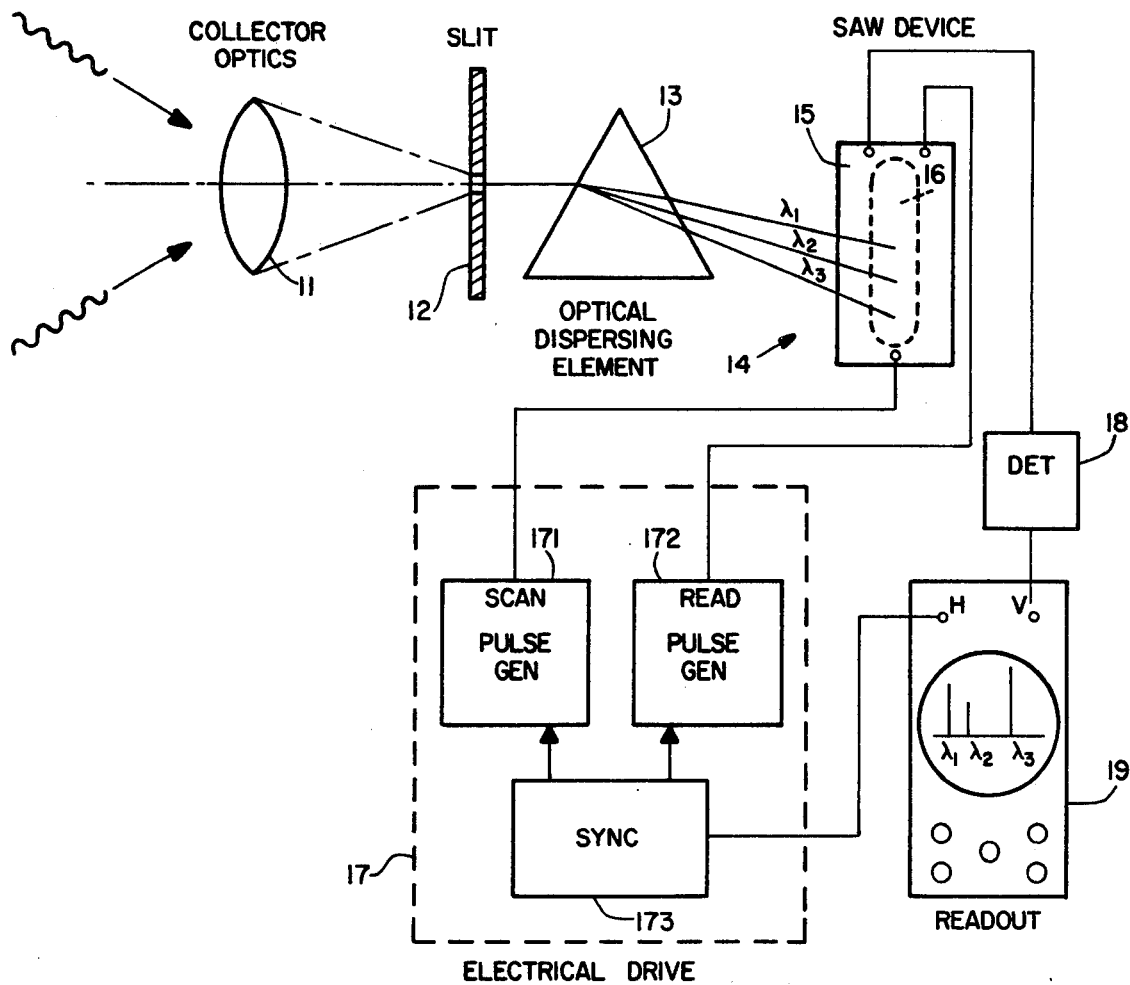

ULTRAFAST SCANNING SPECTROPHOTOMETER

BACKGROUND OF THE INVENTION

1. Field of the Invention

This invention relates to the combined fields of radiation physics and surface acoustic waves. More particularly, this invention relates to the field of spectroscopy. In still greater particularity, the invention relates to a system for the analysis of optical spectra by a fast scan spectrometer. By way of a specific example, the invention will be described as it pertains to a spectrometer capable of accurate spectral analysis from a moving platform in real time.

2. Description of the Prior Art

Spectrometers have been known in the art for many years. In general, spectrometers have been used to measure indicies of refraction and wavelengths of light by a well-understood relationship of refractive angle and refractive index. Prior instruments designed to scan a spectrum for detection of specific spectral lines are well known and are characterized by U.S. Pat. No. 3,482,105 issued on Dec. 2, 1969 to E. K. Hutzler for "Optical Energy Modulator" and U.S. Pat. No. 3,432,238 issued on Mar. 11, 1969 to A. L. Girard for "Spectrometric Apparatus of High Resolving Power".

Although satisfactory for their intended purpose, the prior art spectrometers have been deficient in their ability to make measurements in limited time frames as might, for example, be occasioned by a moving platform, such as a missile, or a transitory phenomenon, such as an explosive detonation. Principally, these limitations are due to the dependence on physically moving parts to establish the scan of the dispersed spectra. These moving parts have presented problems of synchronism and inertia in the short time frame applications.

Other attempts to solve this problem have employed a plurality of photoelectric detectors in an array extending across the spectral focal plane. Such systems, although inertialess, present problems of calibration and physical spacing to obtain the spectral resolution required for present-day measurements.

SUMMARY OF THE INVENTION

The system of the invention provides an inertialess, high-resolution, fast-scan spectrometer which places the optical elements of the spectrometer in fixed relationship to one another and employs a surface acoustic wave photoelectric transducer to intercept the dispersed spectra. Such a system is called a "stairing" system since the optical system is continually directed at the entire optical field rather than being scanned over a portion thereof. Because of this arrangement and the long optical integration intervals made possible thereby, a sensitivity-per-scan-rate capability far superior to prior systems is achieved. Associated, conventional electronic drive circuitry permits rapid scan rates.

BRIEF DESCRIPTION OF THE DRAWINGS

The single FIGURE is a schematic representation of the optical geometry and circuit diagram of the invention.

DESCRIPTION OF THE PREFERRED EMBODIMENT

Referring to the FIGURE, incident radiation impinges the collector optics of the system. The collector optics serves as an energy admitting means and, in the FIGURE, it is illustrated as a simple lens 11. Of course other optical systems may be used if desired. For example, a toroid lens system may beused in some applications where the system is mounted in the foreward portion of an aerial missile. Similarly, other applications may require different optical configurations. The choice as between the various available collector optics, or their omission, is determined by the principles of good optical design bearing in mind the basic purpose of collection and concentration of the incoming radiation and signal-to-noise considerations of the environment.

Likewise, the selection of optical materials from which the collecting optics and the dispersion optics, to be described, are made may cover any of the materials used in such systems. In making a choice of materials, one must observe the principles of good design practice, balancing refractive index and transparency for the wavelengths of interest against such non-optical parameters as may seem appropriate for the particular application. For example, cost and weight may be important considerations for certain applications while the optical properties become more important in the infrared and ultraviolet applications.

The concentrated cone of energy passed by lens 11 is limited in physical extent by appropriate limiting means, such as slit 12. The limiting means serves a two-fold function in the invention.

The first purpose of slit 12 is to limit the amount of energy reaching the dispersing means and, ultimately, the photoelectric detector. The amount of energy passed is determinable by the dimensions of the slit and the concentration properties of the energy admitting means. The greater the amount of energy admitted, the weaker the source to be examined may be without affecting the reliability of the system.

The second function of slit 12 is the control of optical resolution of the system. That is, as is well understood, the narrower the light beam prior to dispersion, the less overlap of dispersed wavelength beams will be experienced and the more easily the individual components of interest may be separated.

These two functions must, therefore, be balanced one-against-the-other together with the other engineering parameters to arrive at an optimum configuration which best serves the particular application. Modernly, a computer assisted analysis makes the slit width determination and other parameter selection routine calculations.

Energy limited by slit 12 impinges a fixedly positioned dispersion element 13 which may be a prism, as illustrated. However, as is obvious to one versed in the optical arts, other dispersion means may be used if desired. For example, diffraction gratings may be used and have many properties which are desirable in this type system. Gratings may be "blazed" to favor a given wavelength or to compensate for a wide slit by using a second, or greater, order of dispersion to enhance the resolution. Such blazing involves particular angular configuration of the grating lines and is well understood in the optical arts.

Gratings are available as either transmission or reflecting types as either type may be employed in the practice of the invention.

Dispersion means 13 separates the energy in the well understood manner into its component wavelengths. Although many wavelengths may be present, the FIGURE shows only three, $\lambda_1$, $\lambda_2$, and $\lambda_3$. This simplification is for purposes of illustration and, or course, should not be considered limiting.

The individual components are directed to impinge a surface acoustic wave, SAW, device 14 which is configured and fixedly positioned to intercept the dispersed energy of interest.

SAW device 14 has an acoustic wave propagating layer 15 and a semiconductor layer 16 spaced therefrom. The spacing of the layers 15 and 16 is optimized to permit charge interaction therebetween. The spacing is small in comparison to the wavelength of the acoustic wave in the acoustic wave propagating layer 15. In developmental models of the invention, the layers 15 and 16 are separated by magnesium floride insulators having thicknesses on the order of 100 nanometers. Although not necessary to make and use the invention, a more complete discussion of the SAW device is fould in Journal de Physique, Colloque C 6, supplement au n° 11-12, tome 23; November–December 1972, pp 231-234.

SAW device 14 is fed by an electrical drive circuit 17 in the well understood manner. That is, a read pulse generator 172 couples a read pulse to the piezoelectric acoustic propagation layer 15, which may be lithium niobate, for example. At a suitable time later, a scan pulse generator 171 transmits a scan pulse to the same layer. The time delay and pulse duration is controlled by synchronizer 173.

The electric fields of these pulses interact with the electron charge densities of the silicon semiconductor layer 16 and are both phase and amplitude modulated thereby. The electron charge density is a pattern corresponding to the dispersed spectra which reaches the adjacent surface of semiconductor layer 16 via transmission through layer 15. An electrode on layer 15 picks up this modulated pulse and transfers it to detector 18 where it is phase or amplitude detected in a conventional manner.

The output from detector 18 is coupled to a suitable readout means 19 for utilization thereby. Readout means 19, for purposes of explanation, is shown as a cathode ray oscilliscope with a time vs. amplitude, or "A", scan. Naturally, other readout and utilization systems may be used, if desired. For example, a filter may be used to produce an output when predetermined wavelengths are present.

The SAW device is capable of scan times using pulsed electrical signals with frequencies of 230 megahertz. Because of the fast scan rate and the stairing optical system, which continuously receives radiation, the system provides the desired sensitivity-per-scan-rate which is very useful over the entire optical spectrum but particularly so in wavelength reigons where the energy level is low.

The acoustic wave propagating layer 15 may be made of material transparent to impinging radiation such that it passes through layer 15 to interact with the adjacent surface of photosensitive layer 16 in the well understood manner to produce the charge carrier variations which interact with the acoustic waves in the operation of the device.

Thus, it may be seen that the foregoing description when taken in view of the appended claims and drawings constitutes a disclosure enabling a skilled electronics worker having the benefit of the teachings contained therein to make and use the invention. Further, the invention as described herein is a meritorious advance in the art which is unobvious to such a worker not having the benefit of these teachings.

What is claimed is:

1. A fast scan spectral instrument comprising:
   energy admitting means for directing a beam of optical energy to form a spectral image;
   limiting means fixedly positioned with respect to said energy admitting means to receive the beam of optical energy from said energy admitting means for establishing a sharply defined energy field having pre-determined dimensions;
   dispersion means fixedly positioned with respect to said limiting means to be in optical communication therewith for breaking the sharply defined energy field into a plurality of beams which diverge from one another in a wavelength-dependent manner;
   a surface acoustic wave photoelectric transducer fixedly positioned in optical communication with said dispersion means for spatially detecting the plurality of beams therefrom;
   electrical means connected in circuit configuration with said surfae acoustic wave photoelectric transducer for energization thereof; and
   readout means connected to said surface acoustic wave photoelectric transducer to receive the electrical output therefrom for utilization thereof.

2. Fast scan spectral instrument according to claim 1 in which said readout means comprises an A-scan cathode ray tube display.

3. Fast scan instrument according to claim 1 where in said electrical means feeds scan and read pulses to said surface acoustic wave photoelectric transducer to establish a scan time less than ten microseconds.

4. A fast scan spectral instrument according to claim 1 in which said surface acoustic wave photoelectric transducer includes:
   a layer of photosensitive material which exhibits a spatial charge in responce to optical excitation; and
   a layer of acoustic wave propagation material spaced adjacent said layer of photosensitive material at a distance facilitating charge interaction therebetween.

5. A fast scan spectral instrument according to claim 4 in which said layer of acoustic wave propagation material is separated from said layer of photosensitive material by a distance of less than one wavelength of the surface acoustic wave.

6. A fast scan spectral instrument according to claim 5 in which said layer of photosensitive material is made of silicon.

7. A fast scan spectral instrument according to claim 5 in which said layer of acoustic wave propagation material is made of a piezoelectric material.

8. A fast scan spectral instrument according to claim 7 in which said piezoelectric material is lithium niobate.

9. A fast scan spectral instrument according to claim 1 in which said dispersion means is a prism.

10. A fast scan spectral instrument according to claim 1 in which said limiting means is an optical slit.

* * * * *